United States Patent [19]

Levine

[11] Patent Number: 4,724,795
[45] Date of Patent: Feb. 16, 1988

[54] AUTOMATIC SOLUTION CONCENTRATION MONITORING SYSTEM

[75] Inventor: Walter E. Levine, Port Huron, Mich.

[73] Assignee: Acheson Industries, Inc., Port Huron, Mich.

[21] Appl. No.: 861,564

[22] Filed: May 9, 1986

Related U.S. Application Data

[62] Division of Ser. No. 740,324, Jun. 3, 1985, abandoned.

[51] Int. Cl.[4] .............................................. B05C 11/10
[52] U.S. Cl. .................................... 118/688; 118/425; 137/91
[58] Field of Search ............... 118/688, 689, 690, 425; 427/8; 222/55, 77; 137/91; 73/433, 434

[56] References Cited

U.S. PATENT DOCUMENTS

| | | | |
|---|---|---|---|
| 1,944,243 | 1/1934 | Kegl et al. | 137/91 |
| 3,515,094 | 6/1970 | McVey | 118/667 |
| 4,526,127 | 7/1985 | Soppota | 118/425 X |

Primary Examiner—Evan K. Lawrence
Attorney, Agent, or Firm—Harness, Dickey & Pierce

[57] ABSTRACT

An improved automatic immersion coating apparatus is disclosed herein which is particularly well suited for use in applying a coating to substantially all the exposed surfaces of a workpiece without incurring any potentially damaging or wearing of the surfaces thereof. The coating apparatus is designed to allow individual workpieces to free fall into a reservoir containing a supply of the coating solution and includes a catch basket, actuation of which is carefully timed so as to enable the time during which the workpiece is immersed in the coating solution to be minimized. Additionally, apparatus is also provided whereby the coating solution is continuously recirculated and the concentration level thereof carefully monitored. This monitoring system operates to actuate metering valves whereby the solution components may be automatically replenished thus enabling the optimum concentration level to be closely maintained.

15 Claims, 9 Drawing Figures

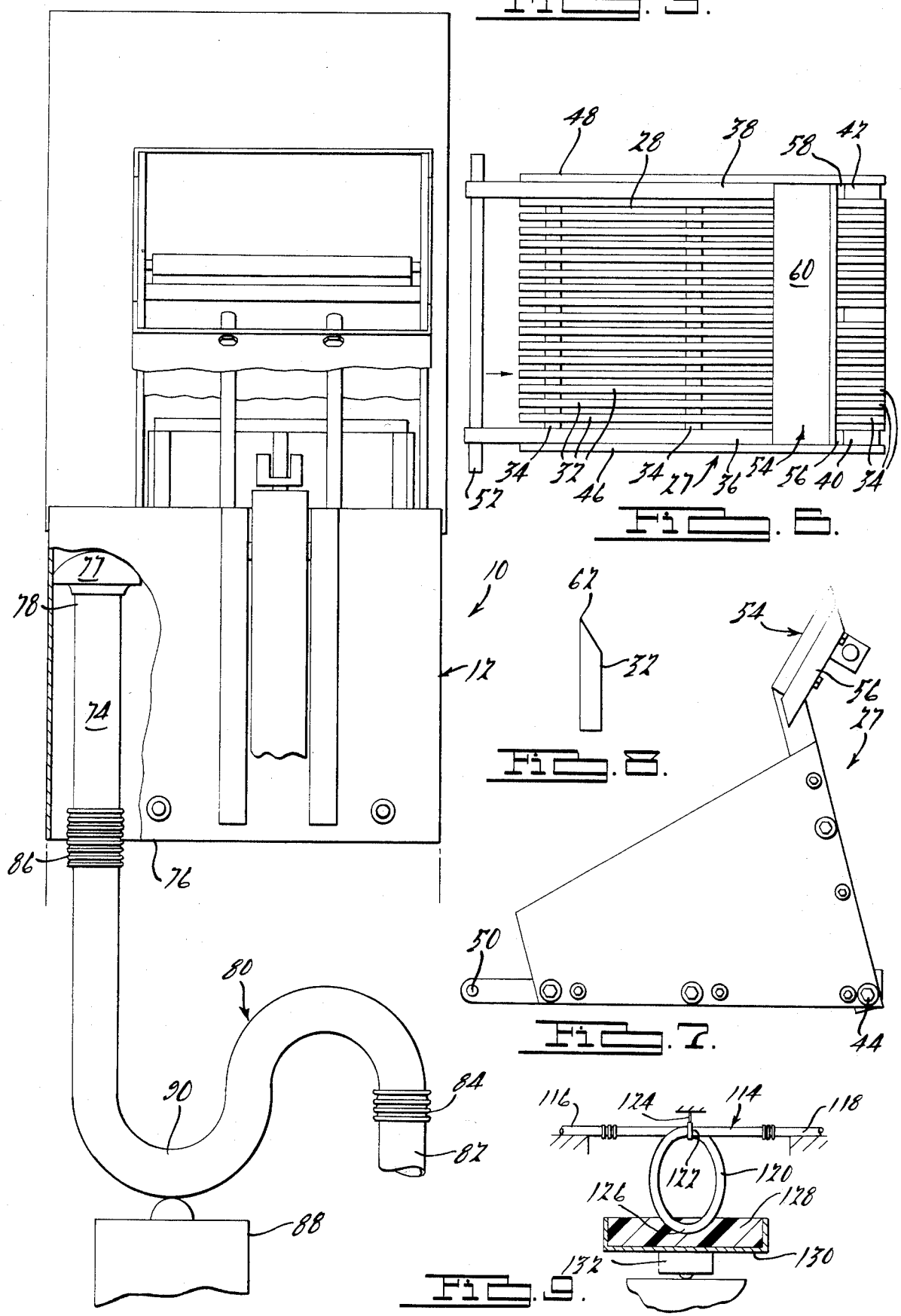

AUTOMATIC SOLUTION CONCENTRATION MONITORING SYSTEM

This is a division of U.S. patent application Ser. No. 740,324, filed June 3, 1985, now abandoned.

BACKGROUND OF THE INVENTION

The present invention relates generally to solution concentration monitoring systems and coating apparatus incorporating same and more particularly to such coating apparatus which is designed to continuously monitor and maintain the concentration level of the coating solution and to enable complete coating of all exposed surfaces of the workpiece.

There exists a wide variety of both applications wherein it is necessary or desirable to apply a coating to workpiece and apparatus for applying same. In some instances it is desirable to apply the coating by immersing the workpiece in a dip tank or the like such as for example in applying lubricants to a billet which is to be forged into a finished form. In such applications it is very important to insure all surfaces of the part are fully coated so as to assure uniform metal flow during the forming process. It also is important to maintain the proper level of concentration of the lubricant in the coating solution at all times. While the rate of consumption of the lubricant may be easily determined on the basis of the number of workpieces being processed, the control of the carrying vehicle or solvent which may be subject to evaporative losses as well as loss from workpiece carry over is much more difficult as such losses depend upon a wide variety of continuously changing conditions such as temperature, relative humidity, air flow in the treating area, etc. For example, one form of such a lubricant comprises an aqueous colloidal dispersion. Rate of loss of such water solvent may depend upon all of the above factors including the temperature of the bath itself.

Additionally, in order to promote more efficient manufacturing of forged parts, efforts are being made to reduce the number of steps in the forging process. One way in which this is accomplished is by fabricating a preformed billet or workpiece so as to reduce the amount of metal flow which must be accomplished during the forming operation. Obviously in such applications, the necessity for insuring that a complete coating of lubricant is applied to the workpiece is particularly important. Further compounding this problem is that because the workpiece is preformed prior to coating, extreme care must be exercised in the handling thereof so as to avoid chipping, nicking, wearing or otherwise damaging of corners, edges, or other surfaces thereof as such damage may result in formation of an unacceptable finished part. This need for careful handling precludes the use of tumbling type coating apparatus wherein a plurality of parts are immersed in batch form. Further, the use of conveyor apparatus, be it a type supporting a part from below or above, results in the contacted portions of the workpiece being inadequately or totally uncoated.

SUMMARY OF THE INVENTION

The present invention, however, overcomes these problems by providing an improved immersion type coating apparatus which is designed to fully and completely coat all exposed surfaces of a workpiece without incurring any damage or wearing of the surface thereof. The apparatus comprises means whereby the workpieces are individually supplied to a coating bath and are allowed to free fall into the bath in timed sequence so as to insure complete coating of all surfaces thereof. Presubmerged apparatus are also provided which is carefully timed to operate to catch the workpiece and remove same from the bath while avoiding excessive cooling thereof. Additionally, the present invention also incorporates continuous monitoring and recirculating apparatus for evaluating the coating bath concentration level and assuring a substantially uniform homogeneous bath is provided whereby proper coating of the workpieces may be assured.

Additional advantages and features of the present invention will become apparent from the subsequent description and the appended claims taken in conjunction with the accompanying drawings.

BRIEF DESCRIPTION OF THE DRAWINGS

FIG. 5 is a front view of the coating apparatus of FIG. 1 with portions thereof broken away;

FIG. 6 is an enlarged view of the catch basket all in accordance with the present invention;

FIG. 7 is a side elevational view of the basket of FIG. 6;

FIG. 8 is an end view of one of the catch arms of the basket shown in section; and FIG. 9 is a fragmentary view of a fluid conduit illustrating an alternative arrangement for monitoring the weight or mass of the coating fluid.

DESCRIPTION OF THE PREFERRED EMBODIMENTS

Figure 1:
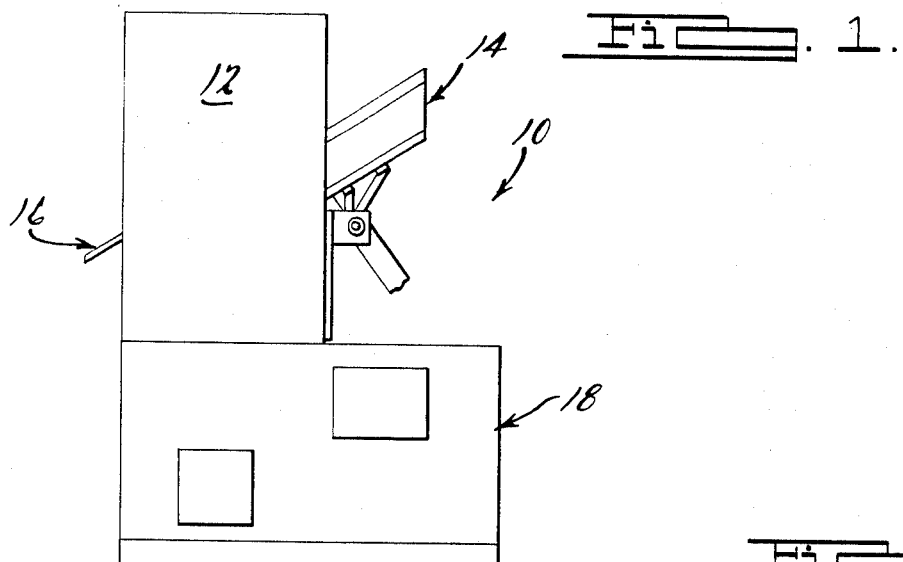
FIG. 1 is a side elevational view of an automatic immersion coating apparatus in accordance with the present invention.
Figure 2:
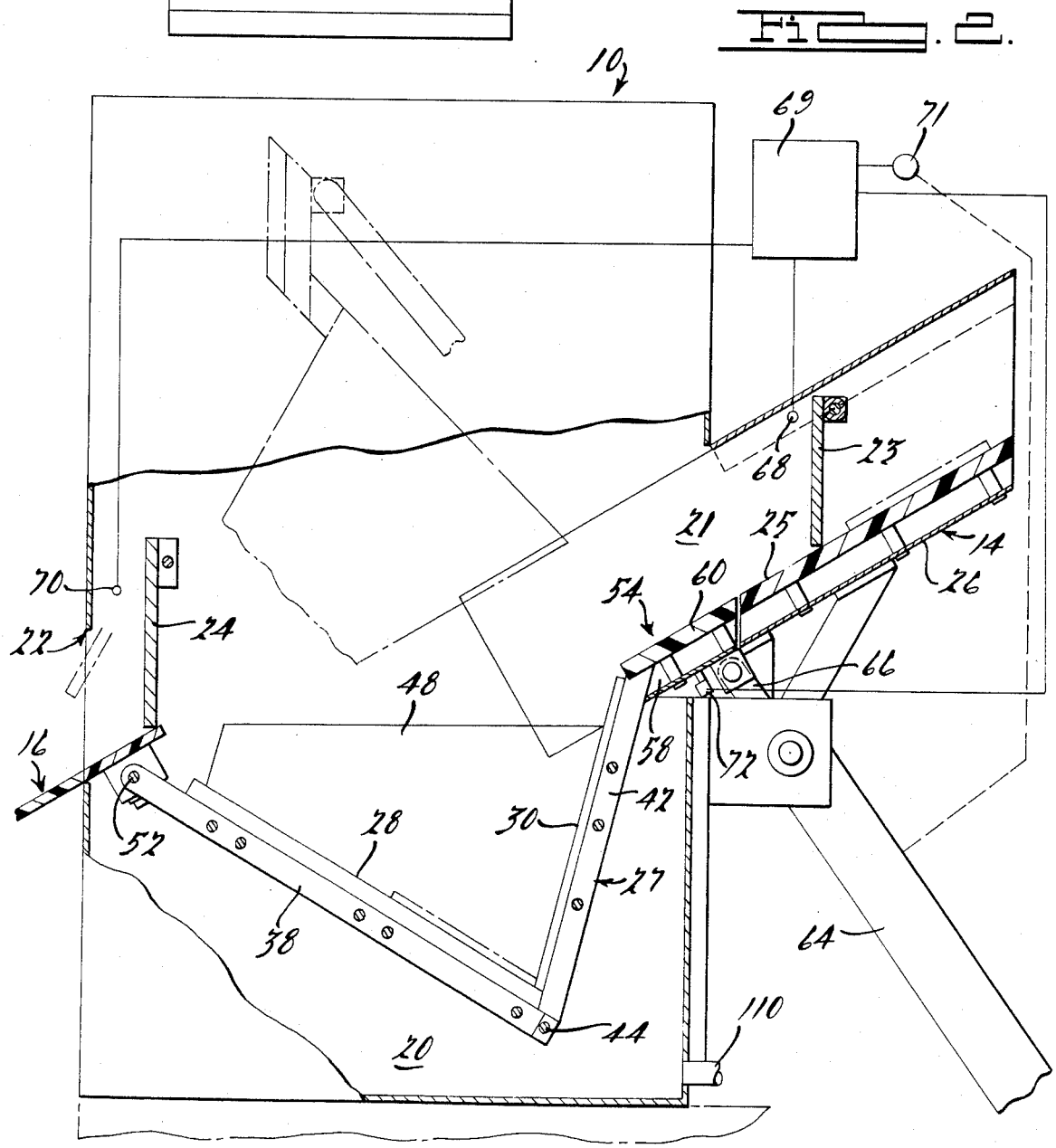
FIG. 2 is an enlarged detail view of a portion of the coating apparatus of FIG. 1 with portions broken away to illustrate the operating details thereof.
Figure 3:
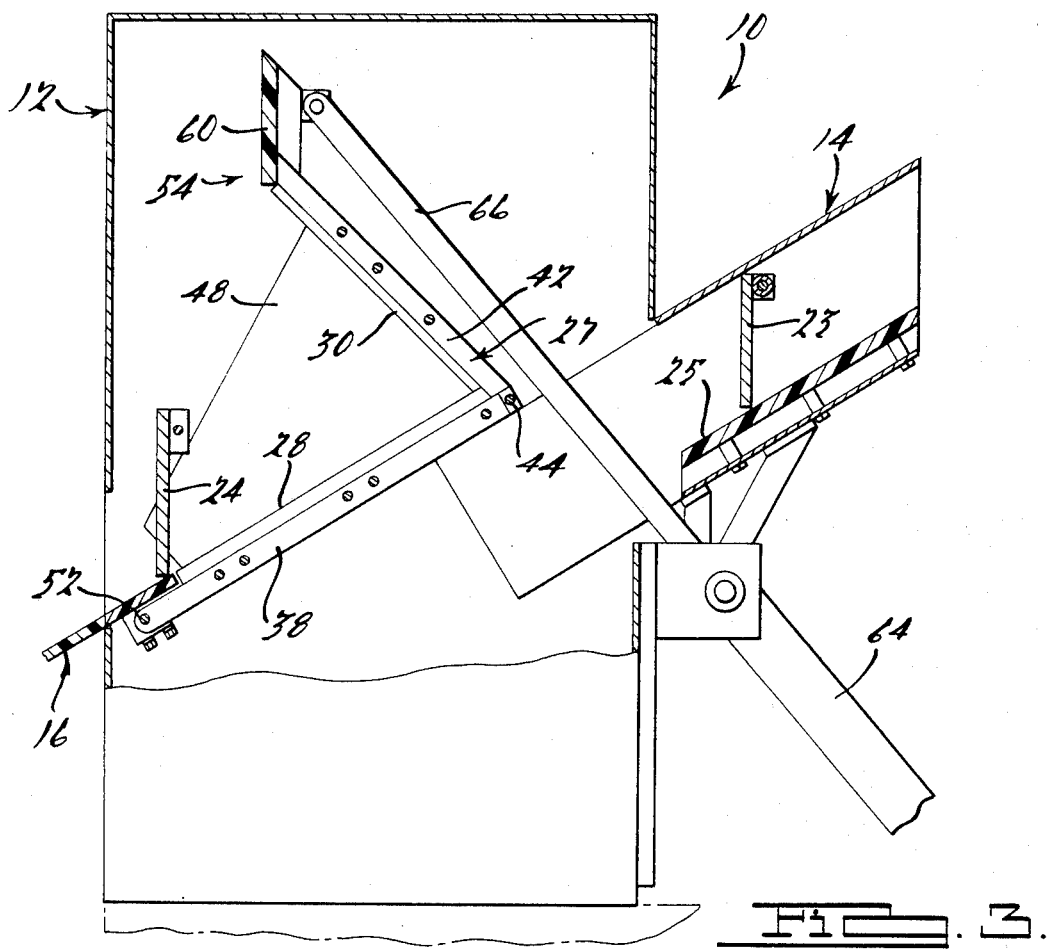
FIG. 3 is a view similar to that of FIG. 2 but showing the catch basket in an elevated position.

Referring now to the drawings and in particular to FIGS. 1 through 3, there is shown an immersion coating apparatus incorporating an automatic solution concentration monitoring system in accordance with the present invention indicated generally at 10. Immersion coating apparatus 10 comprises an upper housing 12 within which the coating bath is contained as well as entry and exit slides 14 and 16. A lower housing 18 supports upper housing 12 and contains a bath reservoir as well as supplies of lubricant concentrate, recirculation pump and associated controls for maintaining the concentration level of the bath.

As best seen with reference to FIG. 2 the lower portion of upper housing 12 defines a dip tank 20 within which is contained a supply of the coating solution in which the workpieces are to be immersed. In order to reduce evaporative losses from the coating bath as well as to minimize the entry of debris into same, housing 12 will preferably totally enclose dip tank 20, the only openings 21, 22 therein being around entry and exit slides 14 and 16. Suitable pivotable doors 23, 24 are provided to close off these openings. Entry slide 14 comprises an inclined ramp 25 and associated support structure 26 secured on one side of upper housing 12 and may extend from a suitable means for sequentially supplying individual workpieces (not shown). Exit slide 16 is secured to the opposite side of upper housing 12 and is positioned so as to receive the coated parts after immersion and deliver them to suitable material handling apparatus for transportation to subsequent work stations. Preferably both entry and exit slides 14 and 16 will have suitable low friction surfaces provided thereon such as for example a Teflon (a registered trademark of E. I. de Pont de Nemours & Co., Wilmington, Del.) or nylon sheet material or the like along which the workpiece travels.

In order to recover and remove workpieces which have been deposited into the coating solution, a catch basket 27 is provided which is pivotably secured to upper housing 12 adjacent the exit slide 16. As shown in FIG. 2, and in FIGS. 6 through 8 in greater detail, catch basket 27 has an irregular shape generally as shown comprising two generally planar surfaces 28, 30 each defined by a plurality of elongated generally parallel spaced slats 32, the surfaces being positioned in end to end relationship and defining an acute included angle therebetween. A plurality of laterally extending slats 34 extend between two pairs of side support arms 36, 38, 40, 42 and serve to support the elongated slats 32 in spaced relationship. The ends of side support arms 36 and 40 as well as 38 and 42 are secured together by suitable fasteners such as bolts 44 in such a manner as to place the adjacent ends of slats 32 in close proximate or engaging relationship so as to prevent loss of a workpiece therebetween. A pair of side plates 46, 48 of a generally trapezoidal shape are secured to support arms and operate to prevent loss of a workpiece from either side of the catch basket 27. One end of each of the support arms extends beyond the ends of the slats and are provided with openings 50 through which a rod 52 extends whereby catch basket 27 may be pivotably supported on housing 12.

An entry slide extension portion 54 is also provided on catch basket 27 being secured to the other end of support arms 40, 42 and comprises an elongated support member 56, 58 attached to each of the arms 40, 42 in angular relationship therewith. A generally rectangular plate member 60 extends between and is secured to support members. Preferably, plate member 60 will have an upper surface provided with a similar material as is provided on the upper surfaces of entry and exit slides 14 and 16.

As best seen with reference to FIG. 2, entry slide extension portion 54 is positioned such that the upper surface thereof is substantially coplanar with the upper surface of entry slide 14 so as to form a smooth continuation of entry slide 14 when the catch basket 27 is in a down position whereby it is assured that a workpiece entering the coating solution will be deposited into the catch basket 27.

Preferably the support arms 36, 38, 40, 42 and side plates 46, 48 of catch basket 27 will be fabricated from a suitable material which will be resistant or immune to attack by the constituents of the coating bath. Also the individual slat members 32 will preferably be fabricated from a suitable polymeric composition such as nylon or the like which may be reinforced with embedded stainless steel wire if required. Preferably each of the slats 32 will have a knife edged bottom contour 62 which as shown in FIG. 8 may be of a single bevel or alternatively double bevel and will operate to aid in minimizing disturbance of the coating bath during reentry of the basket 27. This represents an important aspect of the present invention as splashing or excessive disturbance of the bath may result in temporary entrainment of air bubbles which could adhere to a workpiece upon entry thereof into the bath and prevent or inhibit full coating thereof. It should also be noted in this regard that both the overall size of the catch basket 27 as well as the spacing of slats 32 will be selected in accordance with the size of the workpieces to be handled whereby a minimum number of slats 32 with a maximum spacing therebetween may be utilized while avoiding the possibility of a workpiece slipping therethrough.

In order to reciprocate catch basket 27, a suitable size hydraulic or pneumatic ram 64 is provided which is secured to upper housing 12. The extensible rod portion 66 is pivotably secured to the underside of catch basket 27 immediately below entry slide extension portion 54 thereof. Upon actuation of ram 64, catch basket 27 will be pivoted to a raised position as is shown in FIG. 3 whereby a coated workpiece will be allowed to slide along slats 32 thereof onto exit slide 16. It should be noted that as shown in FIG. 3, catch basket 27 will be so positioned with respect to exit slide 16 that when in a raised position, the upper surfaces of slats 32 will form a relatively smooth coplanar continuation of the upper surface of exit slide.

In order to properly control and time sequence the operation of catch basket 27, suitable sensing means such as a switch 68 is provided which is actuated by opening movement of door 23 caused by movement of the workpiece therethough. Switch 68 will actuate suitable timer means which will in turn actuate ram 64 to begin effecting upward movement of catch basket 27 a predetermined time after actuation of switch 68. This predetermined time delay will be set so as to allow sufficient time for workpiece to traverse the remaining portion of entry slide 14, extension portion 54 and to be totally immersed in the coating bath before contact with catch basket 27. In this manner full coating of the workpiece will be achieved with a minimal amount of time in the coating bath so as to avoid excessive cooling thereof as well as to maximize the rate of production.

Once catch basket 27 has begun its upward movement, the workpiece will be carried therealong and will move outwardly to exit slide 16 as catch basket 27 reaches its upper limit. As the workpiece moves out of the coating apparatus opening movement of exit door 24 will actuate a second switch 70 thereby signalling control means 69 to deactuate or reverse ram 64 so as to return catch basket 27 to its initial position. A third switch 72 is provided which is actuated by catch basket 27 upon its turn to the initial "home" position whereupon suitable material handling means may operate to advance the next workpiece to begin movement down the entry slide whereupon the above cycle may be repeated. It should be noted that while the above operational control system has been described utilizing workpiece actuated switches, other types of sensing means may be easily substituted therefor.

In order to control the solution or bath level within dip tank 20, a suitable overflow conduit 74 is provided projecting upwardly from and through the bottom 76 of the upper housing 12. Preferably, a suitable screen 77 or the like is provided overlying the open upper end 78 of overflow conduit 74 to prevent entry of sludge or other like debris from the dip tank 20 which could then be carried over to a remote storage tank.

The present invention also incorporates means to continuously recirculate and monitor the concentration level of the coating bath. As illustrated and described herein, the present invention is particularly designed for use in coating baths comprising two components each of which differ substantially in weight per unit volume although it should be noted that the apparatus of the present invention may be easily modified to accommodate a greater number of components.

Accordingly, in order to monitor the concentration level of the bath a generally S-shaped or J-tube conduit 80 is provided which is coupled between overflow conduit 74 and a return conduit 82 by means of suitable flexible couplings 84, 86 whereby S-shaped or J-tube conduit is free to move in a vertical direction. A load cell 88 is also provided which operates to sense the weight of the liquid remaining within the U-shaped trap portion 90 of the S-shaped conduit 80 at any given time. It should be noted that because of the S-shaped configuration, only a given amount of fluid will remain within the U-shaped trap portion 90 as any excess will spill over to the return conduit 82. However, in order to avoid potentially erroneous or inaccurate measurement, load cell 88 will preferably be controlled to sense the weight of the fluid only at such times as the catch basket 27 is in an at rest position such as shown in FIG. 2 and prior to the depositing of the next workpiece into the bath.

Load cell 88 will supply a signal proportional to the weight of fluid within the trap portion 90 of S-shaped conduit 80 between each workpiece coating operation to central control means 92 via conductor 94. Central control means 92 will in turn maintain a running average of a predetermined number of such signals which average will be compared to preset values suitable for the particular application. Thus, assuming a two component bath comprised of component A and component B which is significantly heavier than component A, if the average sensed weight is less than the desired preset value, it will be necessary to replenish component B so as to increase the weight of the sample liquid volume. Similarly, if the average sensed weight is above the desired preset weight, component A must be replenished.

In order to accomplish this, separate reservoirs or supplies 96 and 98 for components A and B are provided with flow from each of them being controlled by suitable electrically operated metering pumps 100, 102, operation of which are controlled by central control means. Flow from respective pumps 100 and 102 is conducted to a meniscus mixing chamber 103 via suitable conduits 105, 107 wherein the two components are intermixed in the desired proportions. Thereafter, this mixture is directed into a relatively large reservoir holding tank 104 via conduit 106 wherein it is intermixed with the coating solution being recirculated through the dipping tank.

A presently preferred alternative to the S or J shaped conduit 80 for weight measuring is illustrated in FIG. 9. In this arrangement a flexible conduit 114 having opposite ends thereof suitably connected to conduits 116 and 118 interconnecting reservoir 104 and tank 20 is arranged with a depending oval shaped loop portion 120, the inlet and outlet therefrom crossing each other in side by side relationship in a generally X pattern. The X crossing point 122 of the flexible conduit is fixedly or non-movably supported by means 124 from a suitable portion of the apparatus with which it is to be utilized.

The lower or bottom looped portion 126 of the flexible conduit is shaped with a constant radius of curvature and is embedded within suitable support means 128 such as by means of an expansible type foam polymeric composition contained within a generally U-shaped channel member 130. A load cell 132 is secured to the bottom of the U-shaped channel 130 in a suitable manner and is operative to sense the weight of the fluid within the looped flexible conduit and provide a signal responsive thereto to suitable control means in the same manner as described above with reference to load cell 88.

It should be noted that the above described loop arrangement is well suited for providing either a continuous or periodic indication of the weight of fluid flowing through the looped conduit and hence enable substantially continuous monitoring of the coating fluid makeup. If it is desired to monitor the fluid during continuous flow thereof, this may be done by connecting either the S or J shape tube 80 or the looped flexible conduit described above in parallel with the return line 108 extending from reservoir 104 to tank 20. This eliminates the need to control the timing at which the load cell measurement is made when located in the return line so as to assure sensing during a static at rest condition. Hence, with this arrangement because the fluid is continuously flowing at a relatively constant rate, it is possible to make periodic measurements at any desired interval.

In order to accomplish the continuous recirculation, return conduit returns the coating solution to reservoir 104. A pump 109 is provided which operates to draw the coating solution from reservoir 104 and discharge same into the dip tank 20 via conduit 108. Preferably conduit 108 will be connected to one or more suitable nozzles or fittings 110 provided on the same side of dip tank 20 as the entry slide 14 is positioned and closely adjacent the bottom of the tank 20. In this manner a swirling intermixing of the liquid being returned and the liquid within the bath will be created. Further, liquid movement will tend to move deposits of sludge or other debris which may settle out of the bath and deposit same at a remote location of the dip tank away from the area below the catch basket so as to avoid interference with the operation thereof. Suitable mixer/agitator means 111 also may operationally be provided within reservoir 104 to insure complete intermixing of the coating solution and replenishing flow from conduit 106. Mixer/agitator means 111 may comprise a simple motor driven agitator blade or any other suitable type apparatus.

Figure 4:
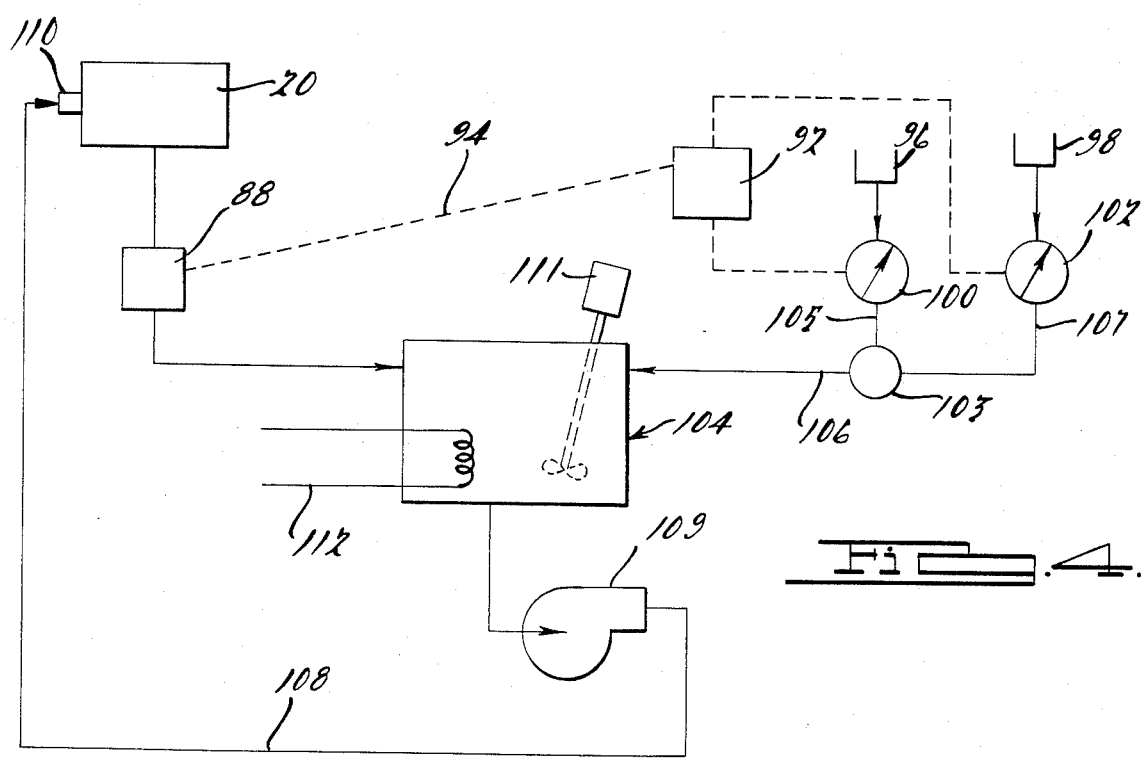
FIG. 4 is a schematic block diagram of the continuous recirculation and concentration level monitoring system.

In many applications, the workpieces to be coated will be entering the coating bath at an elevated temperature. In order to prevent overheating thereof or alternatively in order to maintain the temperature thereof sufficiently high so as to avoid excessive cooling of the workpiece, a suitable heat exchanger 112 may be incorporated into the reservoir as shown schematically in FIG. 4.

It should be noted that while the present invention has been disclosed as incorporating gravimetric measuring means in order to monitor the coating solution, other monitoring devices may also be incorporated therein for this purpose such as for example radio frequency capacitance measurement devices, nuclear magnetic resonance measurement devices, or nuclear radiation densitometers.

Thus, as may now be appreciated, the present invention provides a unique immersion coating apparatus which is particularly well suited for a wide variety of applications. Because the workpiece is totally free of any supporting attachments or engagement with other surfaces at the time it is immersed in the coating solution, full coating of all exposed surfaces is assured. Further, because the coating solution is being continuously recirculated and the concentration level monitored as often as between each cycle, it is possible to reliably maintain the homogenity and desired concentration levels within relatively close tolerances so as to assure optimum performance thereof. It should also be noted that the design and construction of the present invention is relatively simple and straightforward requiring relatively few moving parts which thereby minimize the required maintenance as well as the potential downtime required for same.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. An automatic solution concentration monitoring system for maintaining relative concentrations of at least two components of said solution, said system comprising:
   conduit means through which said solution is caused to flow, said conduit means including a flexible depending looped portion;
   central control means;
   sensing means associated with said conduit means and comprising, a load cell associated with a lower part of said looped portion operative to sense a condition thereof, said condition being indicative of the relative concentrations of said components of said solution and to provide a signal responsive thereto to said control means;
   a supply of each of said components; and
   metering means for selectively controlling the flow of each of said components into said solution,
   said central control means being operative to control said metering means in response to said signal from said sensing means whereby said metering means may operate to replenish said components in said solution to thereby maintain the relative concentrations thereof within desired ranges.

2. An automatic solution concentration monitoring system as set forth in claim 1 wherein said sensing means is operative to sense said condition while said solution is flowing through said conduit.

3. An automatic solution concentration monitoring system as set forth in claim 2 wherein said sensed condition is the mass of said solution within said flexible depending looped portion of said conduit.

4. An automatic solution concentration monitoring system for maintaining relative concentrations of at least two components of said solution, said system comprising:
   conduit means through which said solution is caused to flow, said conduit means including a J-shaped portion
   central control means;
   sensing means associated with said conduit means and comprising a load cell operative to sense the mass of said solution within said J-shaped portion and to provide a signal responsive thereto to said control means;
   a supply of each of said components; and
   metering means for selectively controlling the flow of each of said components into said solution,
   said central control means being operative to control said metering means in response to said signal from said sensing means whereby said metering means may operate to replenish said components in said solution to thereby maintain the relative concentrations thereof within desired ranges.

5. An automatic solution concentration monitoring system as set forth in claim 4 wherein said sensing means is operative to sense said condition while said solution is flowing through said conduit.

6. An automatic solution concentration monitoring system as set forth in claim 5 wherein said sensed condition is the mass of said solution within a defined portion of said conduit.

7. An automatic solution concentration level monitoring system for use with solution treating apparatus, said solution comprising first and second depletable components, said treating apparatus comprising a reservoir tank containing a supply of said solution and treating means for applying said solution to workpieces, said system comprising:
   return conduit means for returning said solution from said treating means to said reservoir;
   pump means for circulating said solution through supply conduit means from said reservoir to said treating means;
   central control means;
   sensing means associated with one of said supply and return conduit means operative to periodically sense a condition indicative of the relative concentrations of said depletable components of said solution and to provide a signal responsive thereto to said central control means;
   a supply of said first component;
   a supply of said second component; and
   metering means connecting between each of said supplies of said first and second components and said reservoir, said metering means being operative to control replenishing flow of said first and second components to said reservoir;
   said central control means being operative to compare said sensed condition with a predetermined value and to control actuation of said metering means in response thereto whereby the concentration level of said solution may be maintained within desired limits.

8. An automatic solution concentration level monitoring system as set forth in claim 7 wherein said sensing means is associated with said supply conduit means and is operative to sense said condition of said solution as said solution is flowing.

9. An automatic solution concentration level monitoring system as set forth in claim 8 wherein said sensing means includes a flexible conduit through which a portion of said solution flows, and means for sensing the mass of said solution within a part of said flexible conduit.

10. An automatic solution concentration level monitoring system as set forth in claim 9 wherein said flexible conduit is connected in parallel with said supply conduit.

11. An automatic solution concentration level monitoring system as set forth in claim 9 wherein said sensing means includes a load cell associated with said part of said flexible conduit.

12. An automatic coating solution concentration level monitoring and recirculation system for an immersion coating apparatus, said coating solution comprising first and second depletable components, said coating apparatus comprising a tank containing a supply of said coating solution through which workpieces are processed, said system comprising:
   a secondary reservoir;
   return conduit means for returning said coating solution from said tank to said reservoir;
   pump means for circulating said coating solution from said reservoir to said tank;
   central control means;
   sensing means associated with said return conduit means operative to periodically sense a condition of said coating solution being returned to said reservoir and to provide a signal responsive thereto to said central control means, said condition being indicative of the relative concentrations of said components of said solution;
   a supply of said first component;
   a supply of said second component; and
   metering means connected between each of said supplies of said first and second components and said reservoir, said metering means being operative to control replenishing flow of said first and second components to said reservoir;
   said central control means being operative to compare said sensed condition with a predetermined value and to control actuation of said metering means in response thereto whereby the concentration level of said coating solution may be maintained within the desired limits.

13. A level monitoring and recirculation system as set forth in claim 12 wherein said sensing means comprise a load cell operative to sense the weight of a predetermined volume of said coating solution.

14. A level monitoring and recirculation system as set forth in claim 12 wherein said sensed condition is measured indirectly without direct contact with said coating solution.

15. A level monitoring and recirculation system as set forth in claim 12 wherein said reservoir further comprises a heat exchanger for controlling the temperature of said coating solution.

* * * * *

UNITED STATES PATENT AND TRADEMARK OFFICE
CERTIFICATE OF CORRECTION

PATENT NO. : 4,724,795
DATED : 2/16/88
INVENTOR(S) : Walter E. Levine

It is certified that error appears in the above-identified patent and that said Letters Patent is hereby corrected as shown below:

| Col. | Line | Claim | |
|------|------|-------|---|
| 1 | 17 | | insert --a-- after --to-- |
| 2 | 33 | | insert --plan-- after --enlarged-- |
| 3 | 10 | | --dePont-- should be --duPont-- |
| 4 | 53 | | --turn-- should be --return-- |

Signed and Sealed this

Twenty-seventh Day of December, 1988

*Attest:*

DONALD J. QUIGG

*Attesting Officer*   *Commissioner of Patents and Trademarks*